July 4, 1967
G. A. VOGT
3,329,802
AMBIENT COMPENSATOR FOR PROPORTIONALLY
CONTROLLED HEATED ENCLOSURES
Filed Sept. 15, 1964
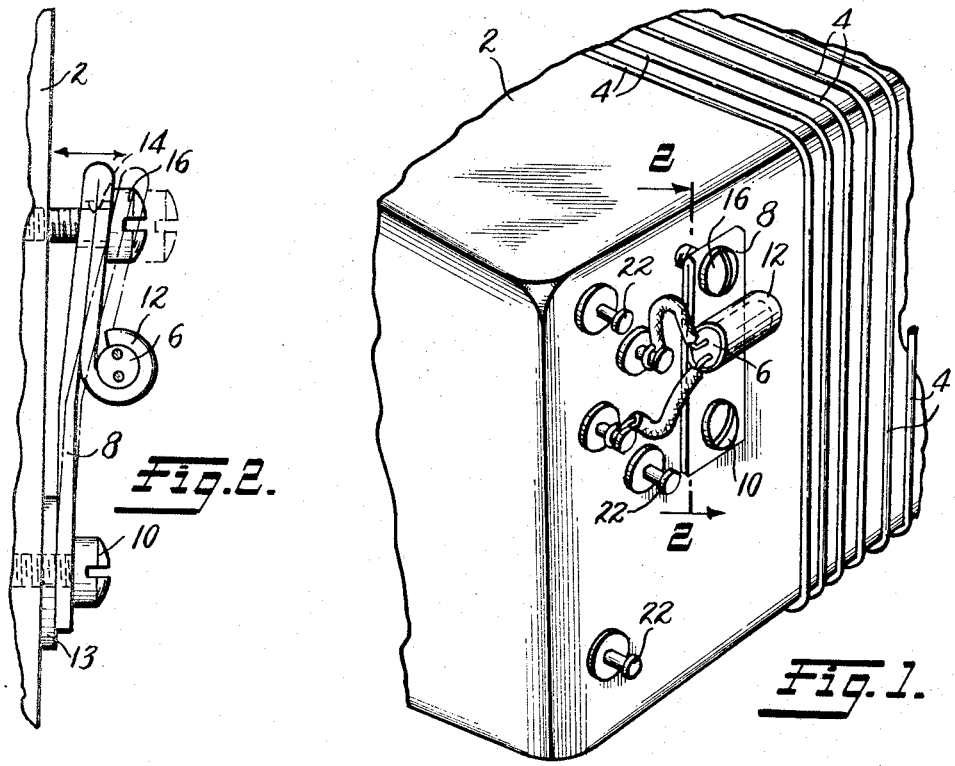
Fig.2.
Fig.1.
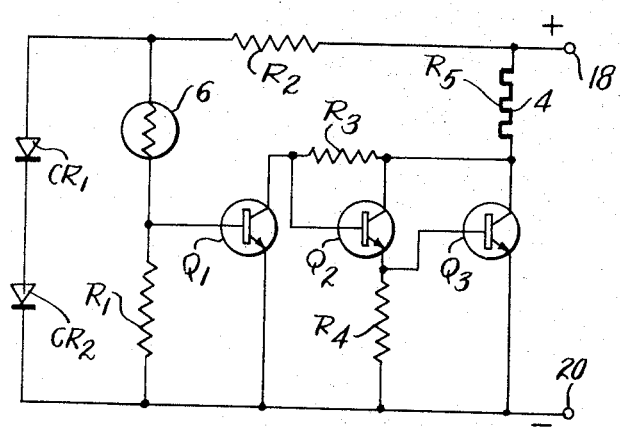
Fig.3.
INVENTOR
Gunther A. Vogt
BY
Bacon & Thomas
ATTORNEYS

3,329,802
AMBIENT COMPENSATOR FOR PROPORTIONALLY CONTROLLED HEATED ENCLOSURES
Gunther A. Vogt, 1628 Brandywine Drive, Charlottesville, Va. 22901
Filed Sept. 15, 1964, Ser. No. 396,518
3 Claims. (Cl. 219—413)

This invention relates to temperature control means and particularly to means for controlling the effects of ambient temperature on a proportionally controlled heated crystal oven. However, the principles of the invention are applicable to other temperature control systems, other than in crystal ovens.

The reference to crystal ovens refers to enclosures or the like adapted to contain crystals customarily used in electronic circuits to control the frequency of oscillators or the like. The crystals customarily used are temperature sensitive in that their frequency changes upon changes of temperature and it is, therefore, important that they be maintained at a uniform operating temperature.

The matter of compensation of crystal ovens for the effects of ambient temperature changes has long been a serious problem. Recently there have been developed proportional control circuits for effecting temperature control in such ovens but where extreme stabilities are required, it has been the practice to use double proportionally controlled means. This means that an inner oven housing the temperature sensitive crystal is constructed to see only the change of temperature of an outer enclosure or oven which, in turn, acts as a barrier between the inner oven and the ambient surroundings. The technique then has been to remove as much of the ambient sensitivity from each oven as possible, such as by insulation or the like, and then accept the production variables that always occur.

The present invention overcomes the awkwardness and complexity of the dual ovens and the expense involved and also provides a means whereby the ambient temperature sensitivity of a single oven can be adjusted after the assembly has been completed and permits a simple adjustment, by means of a screwdriver or the like, to change the thermal characteristics of the oven after it has been assembled and permits a single oven to perform as well as a dual oven. It will also be apparent that a dual oven employing the present invention will also be superior to the present dual ovens. Thus, each individual assembly can be adjusted to take into account all variable characteristics of the components and to precisely match the characteristics of the oscillator and crystals.

In general, the invention comprises a crystal oven enclosure or container having electrical heating means to heat the container. A control circuit regulates the amount of current flowing through the heating means and that current is responsive to not only the temperature of the enclosure but also the temperature of the ambient surroundings and the present invention relates to means for adjusting a temperature sensitive element to vary the relative sensitivity thereof to the temperature of the enclosure and ambient temperature, respectively. The temperature sensitive element is preferably mounted on an adjustable support so that it can be adjustably positioned in different heat sensing relationships to the enclosure and thus be rendered more or less responsive to ambient temperature changes and changes in the oven temperature.

If used with a dual oven, the adjustable temperature sensitive element could be mounted outside the outer oven or between the ovens. In the latter case it would respond to the temperature of the inner oven and also the temperature of the space between the ovens, which is in fact the ambient surroundings of the inner oven.

It is, therefore, an object of this invention to provide a device of the type referred to capable of more precise control of temperature than heretofore possible and operable over a wide range of ambient temperature changes to maintain extreme stability of the oven temperature.

Another object is to provide a control device as set forth wherein the relative effects of the controlled and ambient temperatures on a temperature sensitive element may be regulated.

Still another object is to provide a compensator device as set forth capable of adjustment to compensate for variable characteristics due to variations in the individual components of the assembly or variations resulting from manufacturing steps, so as to render a control means predictably and precisely responsive to ambient temperature changes.

A further object is to provide a compensating device of the type set forth which is simple and economical to manufacture, easy to assemble, and yet efficient and reliable in operation.

Additional and other objects and advantages will become apparent to those skilled in the art as the description proceeds with reference to the accompanying drawings wherein:

FIG. 1 is a fragmentary perspective view of a crystal oven embodying the present invention, many electrical components being omitted for clarity of illustration;

FIG. 2 is an enlarged fragmentary sectional view taken along the line 2—2 of FIG. 1; and FIG. 3 is a schematic circuit diagram of a suitable control circuit.

The crystal oven of the present invention includes a container or oven structure 2 which may be a metallic enclosure within which is housed an oscillator crystal or crystals and which may also contain other electronic components, to be referred to. A resistance heater means 4, in the form of heater wire is wrapped around the container 2 to provide heat to the container to warm the same and keep the interior thereof at a uniform temperature. The current flowing through the heater wire 4 is controlled by a suitable circuit, which may be of the type shown in FIG. 3, to be referred to later. The control circuit, however, includes a temperature sensitive element such as a thermistor 6. A thermistor is a well-known element comprising a resistance device, the electrical resistance of which decreases as the temperature thereof increases. The thermistor 6 is mounted in a clip structure 8 comprising a relatively elongated resilient metal strip, secured at one end to the container 2 by means of a screw 10. Preferably, that end of the strip 8 is spaced from the container 2 by means of a metal washer 13 and thus the secured end of the strip is in heat conducting relation to the wall of the container. The strip 8 extends from that one end in a direction generally parallel to the adjacent wall of the container 2, then is reversely bent at its other end and folded back upon itself, then bent to define a loop 12 embracing and holding the thermistor 6 at a position intermediate the ends of the resilient strip 8. The free end of the strip 8 is provided with an opening 14 therethrough and through which an adjusting screw 16 extends. The screw 16 is threaded into any suitable threaded opening fixed relative to the container 2 so that rotation of the screw 16 will result in flexure of the strip 8 to position thermistor 6 and strip 8 closer to or farther from the adjacent wall of the container. Thus, the position of the strip 8 and thermistor 6 may be adjusted so that they are farther from the wall of the container 2 and thus the effect of ambient temperature thereon is increased. On the other hand, as they are moved closer to the wall of the container 2, they are rendered more responsive to the temperature of that container and less responsive to ambient temperature.

In FIG. 1, terminal posts 22 are shown. The components of the circuit of FIG. 3, normally connected to those posts are not shown in FIG. 1, having been omitted for clarity of illustration of the novel features.

FIG. 3 is a schematic diagram of a suitable control circuit, the operation of which will not be described in detail but which is a circuit similar to the control circuit shown and described in applicant's copending application Ser. No. 343,870, filed Feb. 10, 1964. In brief, however, an appropriate direct current voltage is applied to the terminals 18 and 20 and current flows through R-2 and the crystal rectifiers CR-1 and CR-2, all of which are arranged in series in which a reference voltage is developed across CR-1 and CR-2. As is known, only a small part of the voltage drop appears across the rectifiers and the thermistor 6 and resistance R-1 are connected across the rectifiers in parallel therewith to detect the voltage drop thereacross. The thermistor then controls the conductivity of a transistor Q-1, which in turn ultimately effects the output current of transistor Q-3 and which feeds heater resistor R-5, which is the heating element 4 of FIG. 1. Thus, variations in the temperature of thermistor 6 will regulate the current flowing through R-5 so that upon an increase in ambient temperature less current flows through R-5 and upon a decrease in ambient temperature more current flows through R-5. By adjusting the relative sensitivity of thermistor 6 to ambient temperature on the one hand and enclosure temperature on the other hand, a balance may be effected such that the temperature of the crystals housed within the enclosure 2 can be maintained at a precisely constant value.

While a single specific embodiment of the invention has been shown and described, it is to be understood that other forms may be resorted to and that the invention may be employed as a control means or regulating means for devices other than crystal ovens. For example, it is not essential that the temperature sensitive device be a thermistor specifically, it could be any suitable thermostat or other temperature sensitive means. Also, the support for element 6 need not be actually mounted on the enclosure 2, it may be mounted on any suitable structure where it would respond to both the temperature of the enclosure 2 and the temperature prevailing in the surroundings ambient to enclosure 2.

I claim:

1. A temperature control device comprising: means defining an enclosure which is to be maintained at a predetermined temperature; heating means for heating said enclosure; control means for controlling the operation of said heating means; said control means including a temperature sensitive member; support means mounting said member adjacent to but spaced from and exteriorly of said enclosure; said support means being adjustable to selectively move said temperature sensitive member toward and from said enclosure whereby to regulate its relative response to the temperatures of said enclosure and ambient temperature, respectively, said support means comprising a resilient member in heat conducting relation to said enclosure, said resilient member being biased to tend to move away from said enclosure, and means for flexing said resilient member toward and from said enclosure and for holding it in a selected position of flexure.

2. A temperature control device as defined in claim 1 wherein said enclosure comprises a metal housing; wherein said heating means comprises an electrical resistance heating element in contact with said housing; and wherein said control means regulates the flow of electric current through said heating means in accordance with the temperature of said temperature sensitive member.

3. A temperature control device as defined in claim 2 wherein said temperature sensitive member comprises a thermistor.

References Cited

UNITED STATES PATENTS

| | | | |
|---|---|---|---|
| 1,603,208 | 10/1926 | Keiter | 219—252 |
| 2,007,596 | 7/1935 | Burke | 219—510 |
| 2,034,486 | 3/1936 | Rohne | 219—449 |
| 2,269,863 | 1/1942 | Shaw | 200—139 |
| 2,301,008 | 11/1942 | Baldwin | 219—210 |
| 2,791,706 | 5/1957 | Font | 219—210 X |
| 2,886,686 | 5/1959 | Knapp | 219—413 X |
| 3,008,331 | 11/1961 | Chase | 73—339 |
| 3,144,548 | 8/1964 | Seigel | 219—505 |
| 3,147,369 | 9/1964 | Salton | 200—139 X |
| 3,176,118 | 3/1965 | Scott | 219—413 X |

FOREIGN PATENTS

| | | |
|---|---|---|
| 1,323,532 | 3/1963 | France. |

RICHARD M. WOOD, *Primary Examiner.*

ANTHONY BARTIS, *Examiner.*

C. L. ALBRITTON, *Assistant Examiner.*